(12) United States Patent
Hawkins et al.

(10) Patent No.: US 12,468,822 B2
(45) Date of Patent: Nov. 11, 2025

(54) ZERO TRUST ACCESSORY MANAGEMENT

(71) Applicant: Omnissa, LLC, Mountain View, CA (US)

(72) Inventors: Siavash James Joorabchian Hawkins, Canterbury (GB); Krishna Shanbhag B, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 296 days.

(21) Appl. No.: 18/129,918

(22) Filed: Apr. 3, 2023

(65) Prior Publication Data

US 2024/0248998 A1 Jul. 25, 2024

(30) Foreign Application Priority Data

Jan. 20, 2023 (IN) .............................. 202341004012

(51) Int. Cl.
  *G06F 21/60* (2013.01)
  *G06F 21/31* (2013.01)
  *G06F 21/72* (2013.01)

(52) U.S. Cl.
  CPC ............ *G06F 21/602* (2013.01); *G06F 21/31* (2013.01); *G06F 21/72* (2013.01)

(58) Field of Classification Search
  None
  See application file for complete search history.

(56) References Cited

U.S. PATENT DOCUMENTS

| | | | | |
|---|---|---|---|---|
| 11,228,421 | B1* | 1/2022 | Mesh | G06F 21/36 |
| 2012/0131354 | A1* | 5/2012 | French | H04L 9/3213 |
| | | | | 713/189 |
| 2012/0204245 | A1* | 8/2012 | Ting | H04L 9/3228 |
| | | | | 726/8 |
| 2014/0101454 | A1* | 4/2014 | Thom | G06F 21/57 |
| | | | | 713/182 |
| 2016/0078434 | A1* | 3/2016 | Huxham | G06Q 20/36 |
| | | | | 705/71 |
| 2016/0344560 | A1* | 11/2016 | Caceres | H04W 12/04 |
| 2018/0018663 | A1* | 1/2018 | Van | G07F 7/0873 |
| 2019/0245848 | A1* | 8/2019 | Divoux | H04L 63/0815 |
| 2019/0258781 | A1* | 8/2019 | Qureshi | H04W 12/64 |
| 2022/0191693 | A1* | 6/2022 | Sullivan | H04L 9/0822 |
| 2023/0269066 | A1* | 8/2023 | Chan | H04L 9/3268 |
| | | | | 713/156 |

OTHER PUBLICATIONS

Yubico, YubiKey 5 Series Technical Manual, Seo. 21, 2021, Yubico, 66 Pages (Year: 2021).*

* cited by examiner

*Primary Examiner* — Christopher C Harris
(74) *Attorney, Agent, or Firm* — Kim & Stewart LLP

(57) ABSTRACT

The present disclosure relates to zero trust accessory management. A cryptographic interface application can set a provisioning passcode for the hardware security module. The cryptographic interface application can further set a usage passcode for the hardware security module. The cryptographic interface application can remove an unblock passcode for the hardware security module. The cryptographic interface application can install at least one credential to the hardware security module using the accessory provisioning passcode.

17 Claims, 3 Drawing Sheets

ZERO TRUST ACCESSORY MANAGEMENT

RELATED APPLICATIONS

Benefit is claimed under 35 U.S.C. 119(a)-(d) to Foreign application Ser. No. 202341004012 filed in India entitled "ZERO TRUST ACCESSORY MANAGEMENT", on Jan. 20, 2023, by VMware, Inc., which is herein incorporated in its entirety by reference for all purposes.

BACKGROUND

Enterprises are increasingly making use of security accessories to store the credentials of their mobile and home-based workers. These security accessories can be connected to, but remain separate from, the mobile devices and computers of their end users. Passcodes must be supplied to the accessory to use or modify the stored credentials. Security accessories may not have built-in capability to connect to the internet. They cannot directly receive policy settings nor management commands that could control use of the accessory.

BRIEF DESCRIPTION OF THE DRAWINGS

For a more complete understanding of the embodiments and the advantages thereof, reference is now made to the following description, in conjunction with the accompanying figures briefly described as follows.

Figure 1:
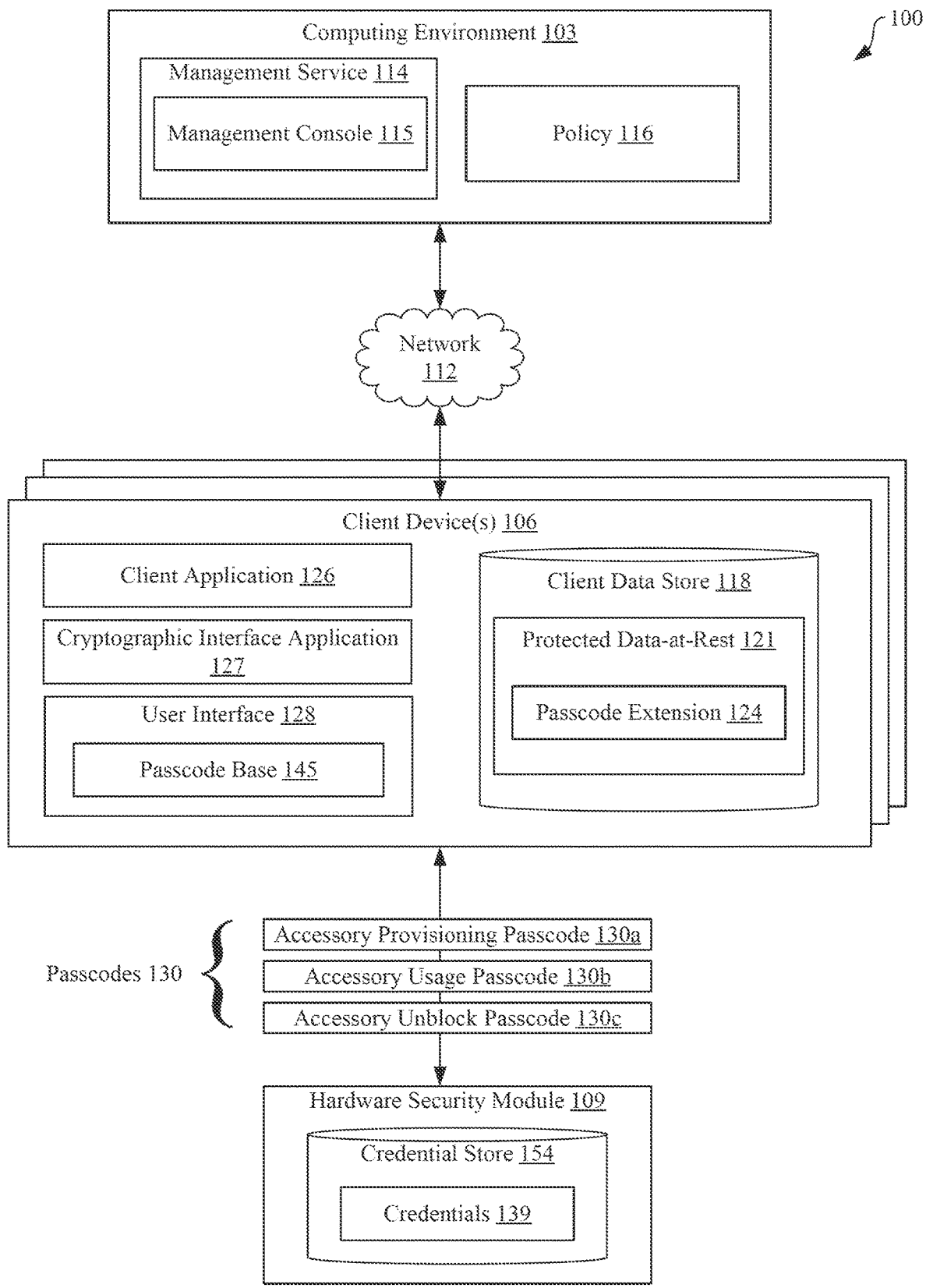
FIG. 1 shows an example of a networked environment 100 according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

The present disclosure relates to zero trust accessory management. Various embodiments of the present disclosure can enable access to credentials stored on security accessories, such as hardware security modules can be controlled by enterprise policies. Accessory passcodes can be replaced or extended with values from a connected device. The disclosed systems and methods can be integrated into mobile and desktop applications.

A cryptographic interface application can store credentials such as, for example, cryptographic keys with protection by a hardware security module, such as a trusted platform module (TPM) chip installed in a mobile smart device, or an external portable hardware authentication device that can be connected to a mobile smart device when needed (e.g., YUBIKEY® manufactured by YUBICO®, TITAN® manufactured by GOOGLE®, etc.). The cryptographic interface application can communicate with mobile devices and computers for cryptographic processing based on the credentials. Communication can be through a physical connection, such as USB or Thunderbolt for example, or through a short-range wireless connection, such as Near-Field Communication (NFC). In some implementations, the cryptographic interface application can require a passcode to be supplied to use a credential, or to modify the credentials store. Passcodes can be supplied externally at the point of use because these accessories do not have keypads nor other entry mechanisms.

FIG. 1 shows an example of a networked environment 100 according to various embodiments. The networked environment 100 can include a computing environment 103, one or more client device(s) 106, and a hardware security module 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 can execute a management service 114, and potentially other applications and administer the operation of client device(s) 106 that are enrolled or otherwise registered with the management service 114. To this end, the management service 114 can also provide mechanisms for a client device 106 (or an application executed by the client device 106) to enroll or otherwise register with the management service 114. The management can also install or cause to be installed various applications on the client device 106 or for various configuration settings of the client device 106 to be set to a specified value. The management service 114 can generate a management console 115 that includes a user interface through which an administrator or other user can manage client devices 106 that are enrolled with the management service 114. The administrator can access the management console 115 using a client device 106 or by any suitable computing device capable of accessing the management console 115.

An enterprise associated with the management service 114 can create a policy 116 that specifies one or more compliance rules for enforcement on the client device 106. When the client device 106 (or an application executed by the client device 106) is enrolled with the management service 114, the management service 114 can provide the policy 116 to the client device 106. In some implementations, the hardware security module 109 may only be used if the client device 106 is in compliance with the policy 116. The one or more compliance rules can include, for example, compliance rules relating to data-at-rest protection or compliance rules related to the generation of passcodes. As another example, the one or more compliance rules representing the policy 116 can include general conditions with which the client device 106 must comply to be secure for enterprise use. As an additional example, the one or more compliance rules representing the policy 116 can include settings relating to the hardware security module 109 and its associated passcodes. In addition, the one or more compliance rules can specify, for instance, location services be activated for the client device 106, that a passcode be set for the client device 106, that the client device 106 is located within a specified geographic area, that a Zero Trust score is below a specified value, or that the certain applications executed by the client device 106 have not been offline from the management service 114 for greater than a specified amount of time.

When the policy 116 is revised by the enterprise, the management service 114 can provide an updated policy 116 to the client device 106. The policy 116 can be modified when, for example, an update to an operating system of the client device 106 calls for a change in security settings of the client device 106. A change in the policy 116 can result in a change in the client device's 106 compliance with the one or more compliance rules specified by the policy 116.

The client device 106 can be representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can include a client data store 118 that can store protected data-at-rest 121 and passcode extension(s) 124, among other types of data. The client data store 118 can include memory of the client device 106, mass storage resources of the client device 106, or any other storage resources on which data can be stored by the client device 106. The client data store 118 can include one or more databases, such as a structured query language (SQL) database, a non-SQL database, or other appropriate database. The data stored in the client data store 118, for example, can be associated with the operation of the various applications or functional entities described below.

The client device 106 can be configured to execute one or more client applications 126, a cryptographic interface application 127, and potentially other application(s). Client application(s) 126 executing on the client device 106 can interact with the cryptographic interface application 127 to use the credentials 139 installed on the hardware security module 109. The client application(s) 126 can represent various types of applications executable by the client device 106. The client application(s) 126 can cause a user interface to be rendered on a display of the client device 106. For example, a client application 126 could be a web browser and the user interface could include a web page rendered within a browser window. As another example, a client application 193 can be an email application and the user interface could represent a graphical user interface for viewing, editing, and composing emails.

The cryptographic interface application 127 can be executed to interact with the hardware security module 109 to provide cryptographic services to client application(s) 126. The cryptographic interface application 127 can be installed on the client device 106 and be enrolled with the management service 114 as a managed application. In some implementations, enrollment can include interaction with a user associated with the client device to, for example, identify and authenticate an identity of the user.

Before setting up the hardware security module 109, the cryptographic interface application 127 can determine whether the client device 106 complies with the policy 116 implemented by an enterprise. In some implementations, the cryptographic interface application 127 may proceed with setting up the hardware security module 109 only if the client device 106 complies with the policy 116. The cryptographic interface application 127 can determine the compliance of the client device based one or more compliance rules representing the policy 116 received from the management service 114.

The cryptographic interface application 127 can enforce any suitable compliance rule that involves a condition that can be detected by the cryptographic interface application 127. The one or more compliance rules representing the policy 116 can include, for example, compliance rules relating to the protection of the protected data-at-rest. As another example, the one or more compliance rules representing the policy 116 can include general conditions with which the client device 106 must comply to be secure for enterprise use. As an additional example, the one or more compliance rules representing the policy 116 can include settings relating to security accessories and their passcodes. In addition, the one or more compliance rules can specify, for example, location services be activated for the client device 106, that a passcode be set for the client device 106, that the client device 106 is located within a specified geographic area, that a Zero Trust score is below a specified value, or that the cryptographic interface application 127 has not been offline from the management service 114 for greater than a specified amount of time.

In some implementations, the client device 106 can become non-compliant if some change results in violation of one or more of the compliance rules. For example, a compliance rule can specify that the client device 106 has an unlock passcode set. If a user were to remove an unblock passcode that had been set on the client device 106, the client device 106 could become non-compliant. As another example, In some implementations, a change in the policy 116 or other change can result in the client device 106 becoming non-compliant. For example, an update to an operating system of the client device 106 can be released that results in a change in the policy 116. The cryptographic interface application 127 can then receive an updated policy 116 from the management service 114. The cryptographic interface application 127 can then determine whether the client device 106 is in compliance with one or more compliance rules specified by the updated policy 116. In some implementations, if the client device 106 is not in compliance with the one or more compliance rules, the cryptographic interface application 127 can display a warning message to a user of the client device 106. If the user then fails to install the update, the cryptographic interface application 127 can reject subsequent attempts by client application(s) 126 to use the credentials 139 until the update is installed. In some implementations, the cryptographic interface application 127 can continue to allow use of the hardware security module 109 for a predetermined period of time following the client device 106 becoming non-compliant, which can be specified by the policy 116.

To begin use of a hardware security module 109, the cryptographic interface application 127 can complete a setup process. To begin the setup process, the cryptographic interface application 127 can connect to a new or factory reset hardware security module 109. The hardware security module 109 can use factory default passcodes, which can be programmed into the cryptographic interface application 127.

The hardware security module 109 setup process can further include setting one or more passcodes 130 for the hardware security module 109. To facilitate any user interaction that may be involved in setting a passcode 130, the cryptographic interface application 127 can provide a user interface 128 rendered in a display of the client device 106. The user interface 128 can display prompts or other messages to the user and accept user input from the user. The cryptographic interface application 127 can set an accessory provisioning passcode 130a, an accessory usage passcode 130b, and an accessory unblock passcode 130c (collectively "passcodes 130") for the hardware security module 109 based on the policy 116.

For example, the cryptographic interface application 127 can set an accessory provisioning passcode 130a for the hardware security module 109. The accessory provisioning passcode 130a can represent a passcode supplied to modify a credential store of the hardware security module 109. For example, the accessory provisioning passcode 130a can be used to generate or import a new credential 139, or to delete a credential 139.

To set a new accessory provisioning passcode 130a, the cryptographic interface application 127 can access a current accessory provisioning passcode 130a for the hardware security module 109. If the cryptographic interface application 127 has not previously set an accessory provisioning passcode 130a, however, the cryptographic interface application 127 can access a factory default accessory provisioning passcode 130a.

In some implementations, the cryptographic interface application 127 can generate a random sequence for the accessory provisioning passcode 130a. To do so, the cryptographic interface application 127 can use a suitable secure random number generated provided by the client device 106. The cryptographic interface application 127 can store this random sequence within the protected data-at-rest 121. The cryptographic interface application 127 can refrain from displaying this random sequence to a user of the client device 106.

As another example, the cryptographic interface application 127 can set an accessory usage passcode 130b for the hardware security module 109. The accessory usage passcode 130b can represent a passcode supplied to process cryptographic operations with the credentials 139, such as signing or decrypting data using one or more credentials 139 without disclosing the credentials 139. If an incorrect accessory usage passcode 130b is entered too many times, then the hardware security module 109 will enter a blocked state. When the hardware security module 109 is in a blocked state, the hardware security module 109 will not process cryptographic operations, even if a correct accessory usage passcode 130b is supplied.

To set a new accessory usage passcode 130b, the cryptographic interface application 127 can access a current accessory usage passcode 130b for the hardware security module 109. If the cryptographic interface application 127 has not previously set an accessory usage passcode 130b, however, the cryptographic interface application 127 can access a factory default accessory usage passcode 130b.

In some implementations, the cryptographic interface application 127 can generate a random sequence for the accessory usage passcode 130b. To do so, the cryptographic interface application 127 can use a suitable secure random number generated provided by the client device 106. The cryptographic interface application 127 can store this random sequence within the protected data-at-rest 121. The cryptographic interface application 127 can refrain from displaying this random sequence to a user of the client device 106. The sequence used for the accessory usage passcode 130b can be different from that of the accessory provisioning passcode 130a.

In some implementations, the cryptographic interface application 127 can make a new accessory usage passcode 130b available to client application(s) 126 through a secure sharing mechanism, if specified by the policy 116. For example, the cryptographic interface application can employ an iOS® shared keychain group for client application(s) 126 developed by a same developer as the cryptographic interface application 127. As another example, the cryptographic interface application 127 can employ an Android® content provider, where access to the content provided is controlled by the policy 116. For instance, the policy 116 can specify that access to the accessory usage passcode 130b is limited to client application(s) 126 enrolled with the management service 114. As an additional example, the cryptographic interface application 127 can employ any native inter-application communication mechanism through which encrypted data can be sent. The management service 114 can mediate sharing of encryption keys so that data can only be decrypted by recognized enterprise client application(s) 126.

In some implementations, the policy 116 can specify that the accessory usage passcode 130*b* can be shared only with client application(s) 126 that enforce a same set of compliance rules as the cryptographic interface application 127. If the accessory usage passcode 130*b* includes a passcode extension 124, only that passcode extension 124—the value generated and stored in the protected data-at-rest 121 by the cryptographic interface application 127—may be shared with client application(s) 126.

In some implementations, client application(s) 126 can access the accessory usage passcode 130*b* using a process similar to a passcode recovery process discussed below.

The hardware security module 109 can be used directly by client application(s) 126 that are capable of sending cryptographic requests to the hardware security module 109. A client application 126 can send cryptographic request to the hardware security module 109 if, for example, the client application 126 has integrated accessory interface software development kit (SDK). In some implementations, client application(s) 126 that interact with the hardware security module 109 may not be required to implement a same set of functions as the cryptographic interface application 127. For example, client application(s) 126 may not be required to implement functionality to change passcodes 130 or install credentials 139 on the hardware security module 109.

During setup of the hardware security module 109, the cryptographic interface application 127 can remove an accessory unblock passcode 130*c* for the hardware security module 109 if required by the policy 116. The accessory unblock passcode 130*c* can represent a passcode supplied to clear a blocked state of the hardware security module 109. The accessory unblock passcode 130*c* may not be stored in the client data store 118. The accessory unblock passcode 130*c* can be supplied to clear a blocked state of the hardware security module 109. The hardware security module 109 can enter a blocked state if a user enters an incorrect accessory usage passcode 130*b* more than a predetermined number of times. After the blocked state is cleared, the cryptographic interface application 127 can require the user to set a new accessory usage passcode 130*b*. The accessory unblock passcode 130*c* can be supplied with a new accessory usage passcode 130*b* or can set the accessory usage passcode 130*b* to a well-known value. In some implementations, setting an accessory unblock passcode 130*c* is optional.

In some implementations, the cryptographic interface application 127 can set the accessory unblock passcode 130*c*, according to the policy 116. The policy 116 could, for example, specify that a human-enterable value be retrieved directly or indirectly from the management service 114. This human-enterable value can be practical for a human to enter but would not be shown to a user of the client device 106. As another example, a random value could be generated by the cryptographic interface application 127. The random value can be impractical for a human to enter and would not be shown to the user of the client device 106. The random value can be stored in the client data store 118 for later retrieval.

The cryptographic interface application 127 can install credentials 139 on the hardware security module 109. In some implementations, the cryptographic interface application 127 can install credentials 139 on the hardware security module 109 using the accessory provisioning passcode 130*a*. In some implementations, the cryptographic interface application 127 can receive a certificate signing request from the hardware security module 109, which the cryptographic interface application 127 can provide to a certifying authority. The cryptographic interface application 127 can refrain from persistently storing any private keys that accompany the credentials 139 and can minimize a time that the credentials 139 are stored in a run-time memory of the client device 106.

The cryptographic interface application 127 can interact with a user of the client device 106 to complete a credential issuance process. In some implementations, the credentials 139 can be provided by a Personal Identity Verification (PIV) service. In that case, the credentials 139 can be derived from PIV (PIV-D) certificates. In some implementations, the cryptographic interface application 127 can offer a user of the client device 106 a choice among a list of PIV providers, which can be specified by the policy 116.

The credentials 139 may not be usable unless the cryptographic interface application 127 provides the accessory provisioning passcode 130*a*. The cryptographic interface application 127 can therefore control usage of the hardware security module 109 and thereby enforce any compliance rules specified in the policy 116 regarding usage of the hardware security module 109. In addition, the credentials 139 may not be exported nor new credentials 139 installed on the hardware security module 109 unless the cryptographic interface application 127 provides the accessory provisioning passcode 130*a*.

In some implementations, the cryptographic interface application 127 can enable recovery of the accessory provisioning passcode 130*a* or accessory usage passcode 130*b*. To enable recovery of the accessory provisioning passcode 130*a* or accessory usage passcode 130*b*, the cryptographic interface application 127 can request an encryption key from a passcode recovery service. The passcode recovery service can require authentication of a user of the client device 106 and that the user has permission to request an encryption key, which can be specified by the policy 116. The cryptographic interface application 127 can receive a public key and a key pair locator. The key pair locator can include, for example, a uniform resource identifier (URI) that enables the cryptographic interface application 127 to locate the passcode recovery service. The cryptographic interface application 127 can generate a passcode recovery file that includes at least the key pair locator and the accessory provisioning passcode 130*a* or accessory usage passcode 130*b* encrypted using the public key. The passcode recovery file can be stored in storage remote to the client device 106 such as, for example, a remote file hosting service.

To recover the accessory provisioning passcode 130*a* or accessory usage passcode 130*b*, the cryptographic interface application 127 can obtain the passcode recovery file. The cryptographic interface application 127 can read an address of the passcode recovery service from the passcode recovery file. The cryptographic interface application 127 can request decryption of the accessory provisioning passcode 130*a* or accessory usage passcode 130*b*—which can be included in an encrypted form in the passcode recovery file— from the passcode recovery service at that address. To obtain decryption, the user can authenticate with the passcode recovery service and be recognized as having permission to decrypt the accessory provisioning passcode 130*a* or accessory usage passcode 130*b*, which can be specified by the policy 116.

Recovery of the accessory provisioning passcode 130*a* may be needed when, for example, the client data store 118 has been cleared by mistake or because of repeated incorrect password entry. As another example, recovery of the accessory provisioning passcode 130*a* or accessory usage passcode 130*b* can be employed when the cryptographic interface application 127 has been uninstalled and reinstalled from the client device 106 for use with a same hardware security module 109. As an additional example, recovery of the accessory provisioning passcode 130a or accessory usage passcode 130b can be employed in a case of forensic examination of storage on the hardware security module 109. As yet another example, recovery of the accessory provisioning passcode 130a or accessory usage passcode 130b can be employed when the hardware security module 109 is used with a different client device 106 or other computing device. In this case, enabling recovery and the actual recovery of the accessory provisioning passcode 130a or accessory usage passcode 130b can take place on different devices.

If client data store 118 is cleared, then credentials 139 on the hardware security module 109 may not be used or exported, and new credentials 139 may not be installed on the hardware security module 109. The client data store 118 can be cleared by an uninstallation of the cryptographic interface application 127 or by a command received from the management service 114.

The protected data-at-rest 121 can employ various data protection schemes for the data stored therein. In some implementations, the cryptographic interface application 127 can require a user of the client device 106 to set an application passcode. The cryptographic interface application 127 can derive an encryption key from the application passcode and encrypt data stored in the client data store 118. The application passcode would not be stored persistently in the client data store 118, so the cryptographic interface application 127 would prompt the user to provide the application passcode whenever the application passcode is used. In some implementations, the cryptographic interface application 127 can participate in an application single sign-on (SSO) scheme with client application(s) 126 that are enrolled with the management service 114. In that case, the cryptographic interface application 127 and client application(s) 126 can share the application passcode and the key derived from that application passcode.

In some implementations, the cryptographic interface application 127 can require the user to have set a device passcode and rely on data-at-rest protection provided by the client device 106 for the protected data-at-rest 121. The device passcode can be based on key derivation, for example, or the device passcode can be entered in a trusted user interface that unlocks a hardware-backed key store, for example. The policy 116 can allow or disallow usage of a device passcode based on, for instance, a model of the client device or based on a presence of hardware-backed security at runtime. If a user removes the device passcode, then access to the cryptographic interface application 127 can be blocked.

In some implementations, a passcode 130 can include an automatic passcode. An automatic passcode can include a random value generated by the cryptographic interface application 127, the format and other requirements of which can be specified by the policy 116. An automatic passcode can be completely hidden from a user of the client device 106.

In other implementations, a passcode 130 can comprise an extended passcode. An extended passcode can include a random sequence together with a user-input value. For example, the cryptographic interface application 127 can receive input from a user of the client device 106 via the user interface 128, where the input can include a value that can comprise a passcode base 142. The acceptable values for this passcode base 142 may be dictated by the policy 116. In some implementations, if a user's input is not supported by the hardware security module 109, the cryptographic interface application 127 can use passcode rendering to generate a passcode base 142 in a format supported by the hardware security module 109 from the user input. As an example, the cryptographic interface application 127 can convert user input in an unsupported language into Unicode code points, which can be numeric. In some implementations, the cryptographic interface application 127 can generate a shorter or longer passcode base 142 from user input by, for example, applying a cryptographic hash function to the user input. This would enable a user to provide input that is more memorable to the user, even if it is shorter or longer than the hardware security module 109 would support.

The cryptographic interface application 127 can then generate and store an additional, random value, which can comprise a passcode extension 124. The cryptographic interface application 127 can combine the passcode base 142 with the passcode extension 124 to generate a passcode 130, which can then be set on the hardware security module 109. The cryptographic interface application 127 can combine the passcode base 142 and the passcode extension 124 using concatenation, cryptographic hashing, or any other suitable method.

If the accessory provisioning passcode 130a is an automatic passcode or an extended passcode, it remains true that new credentials 139 may not be installed on the hardware security module 109 nor existing credentials 139 exported from the hardware security module 109 without the cryptographic interface application 127 and the accessory provisioning passcode 130a. In addition, it remains true that the credentials 139 installed on the hardware security module 109 cannot be used without the cryptographic interface application 127 and the accessory usage passcode 130b if the accessory provisioning passcode is an automatic passcode or an extended passcode. If the accessory provisioning passcode 130a or the accessory usage passcode 130b is only a compliant passcode, however, the corresponding condition above may not apply. In addition, if the accessory provisioning passcode 130a and/or the accessory usage passcode 130b is rendered by the cryptographic interface application 127 and is not an extended passcode, however, the above condition(s) may not apply if the rendering algorithm is known and can be repeated.

In some implementations, if a passcode 130 is not automatic, then the cryptographic interface application 127 can prompt the user to enter the passcode base 142 each time the cryptographic interface application 127 uses the corresponding passcode. Likewise, only a value generated and persistently stored by the cryptographic interface application 127 may be recoverable. If an automatic passcode is used, then the entire passcode 130 would be recoverable. Otherwise, only the passcode extension 124 would be recoverable. A passcode base 142, which can be provided by the user, may not be recoverable.

In some implementations, an enterprise accessory unblock passcode 130c (as opposed to an accessory unblock passcode 130c set by a user of the client device 106) can be used to clear a blocked state of the hardware security module 109. For example, an enterprise accessory unblock passcode 130c can be used if the accessory usage passcode 130b is partially or completely based on user input and the user has forgotten the required input. As another example, an enterprise accessory unblock passcode 130c can be used if the accessory usage passcode 130b is partially or completely automatic (randomly generated by the cryptographic interface application 127). In that case, attempts to use the hardware security module 109 with an application other than the cryptographic interface application 127 can be blocked because the automatic passcode or automatic portion of the passcode would not be provided, and the hardware security module 109 would enter a blocked state after a predetermined number of such attempts.

A blocked state of the hardware security module 109 can be cleared using an enterprise accessory unblock passcode 130c by an administrator associated with the enterprise. How the administrator can obtain the enterprise accessory unblock passcode 130c can depend on a type of enterprise accessory unblock passcode 130c in use. If the enterprise accessory unblock passcode 130c is human-enterable, the administrator can discover the enterprise accessory unblock passcode 130c by, for example, accessing the enterprise accessory unblock passcode 130c using a management console 115 provided by the management service 114. If the enterprise accessory unblock passcode 130c is automatic, then the administrator can use a cryptographic interface application 127 installed on the administrator's client device 106 to retrieve the enterprise accessory unblock passcode 130c. The administrator can be authenticated as an administrative user with different privileges compared to the user associated with the blocked state hardware security module 109. The administrator can have privileges to retrieve the enterprise accessory unblock passcode 130c but not, for example, the accessory provisioning passcode 130a or accessory usage passcode 130b.

The administrator can unblock the hardware security module 109 using the enterprise accessory unblock passcode 130c and set a temporary accessory usage passcode 130b. At this point, the client device 106 can be considered non-compliant with the policy 116. The temporary accessory usage passcode 130b can be, for example, a short human-enterable passcode that the administrator provides to the user of the client device 106 associated with the hardware security module 109. As another example, the temporary accessory usage passcode 130b can be an automatic passcode that is saved to a passcode recovery service as discussed above. The temporary accessory usage passcode 130b would not be stored on the administrator's client device 106. The cryptographic interface application 127 can allow the user to enter or recover the temporary accessory usage passcode 130b, at which the client device 106 can be considered compliant with the policy 116. The hardware security module 109 can then be unblocked, and the credentials 139 can again be used.

The hardware security module 109 can represent a dedicated microcontroller that securely stores credentials 139 (such as one or more private key(s)) and provides support for various cryptographic operations or primitives using credentials 139 installed on the hardware security module 109. To that end, the hardware security module 109 can provide cryptographic services to the cryptographic interface application 127. For example, the hardware security module 109 could sign an arbitrary piece of data using a credential 139 like a private key and provide the signature in response without disclosing the credential 139. Similarly, the hardware security module 109 could decrypt an arbitrary piece of data encrypted using a respective public key for a private key from the credentials 139 and provide the decrypted data in response without disclosing the private key. The hardware security module 109 can include, for instance, a portable hardware authentication device that can be connected to the client device 106 when needed (e.g., YUBIKEY® manufactured by YUBICO®, TITAN® manufactured by GOOGLE®, etc.). In other implementations, however, the hardware security module 109 could comprise a trusted platform module (TPM) chip installed in the client device 106.

The hardware security module 109 can be associated with a unique identifier (e.g., a serial number) that can be used to identify the hardware security module 109. The hardware security module 109 can be factory reset to clear a credential store 154 and reset the accessory provisioning passcode 130a, the accessory usage passcode 130b, and the accessory unblock passcode 130c to factory default values.

The credentials 139 may not be usable without the accessory usage passcode 130b provided by the cryptographic interface application 127. In addition, the credentials 139 may not be exported nor new credentials 139 installed on the hardware security module 109 without the accessory provisioning passcode 130a provided by the cryptographic interface application 127.

When an incorrect accessory usage passcode 130b is supplied to the hardware security module 109 more than a predetermined number of times, the hardware security module 109 can enter a blocked state. In this blocked state, the hardware security module 109 can reject attempts to use the credentials 139, even if a correct accessory usage passcode 130b is subsequently supplied. The blocked state can be cleared by supplying the accessory unblock passcode 130c, after which a new accessory usage passcode 130b is set.

Figure 2:
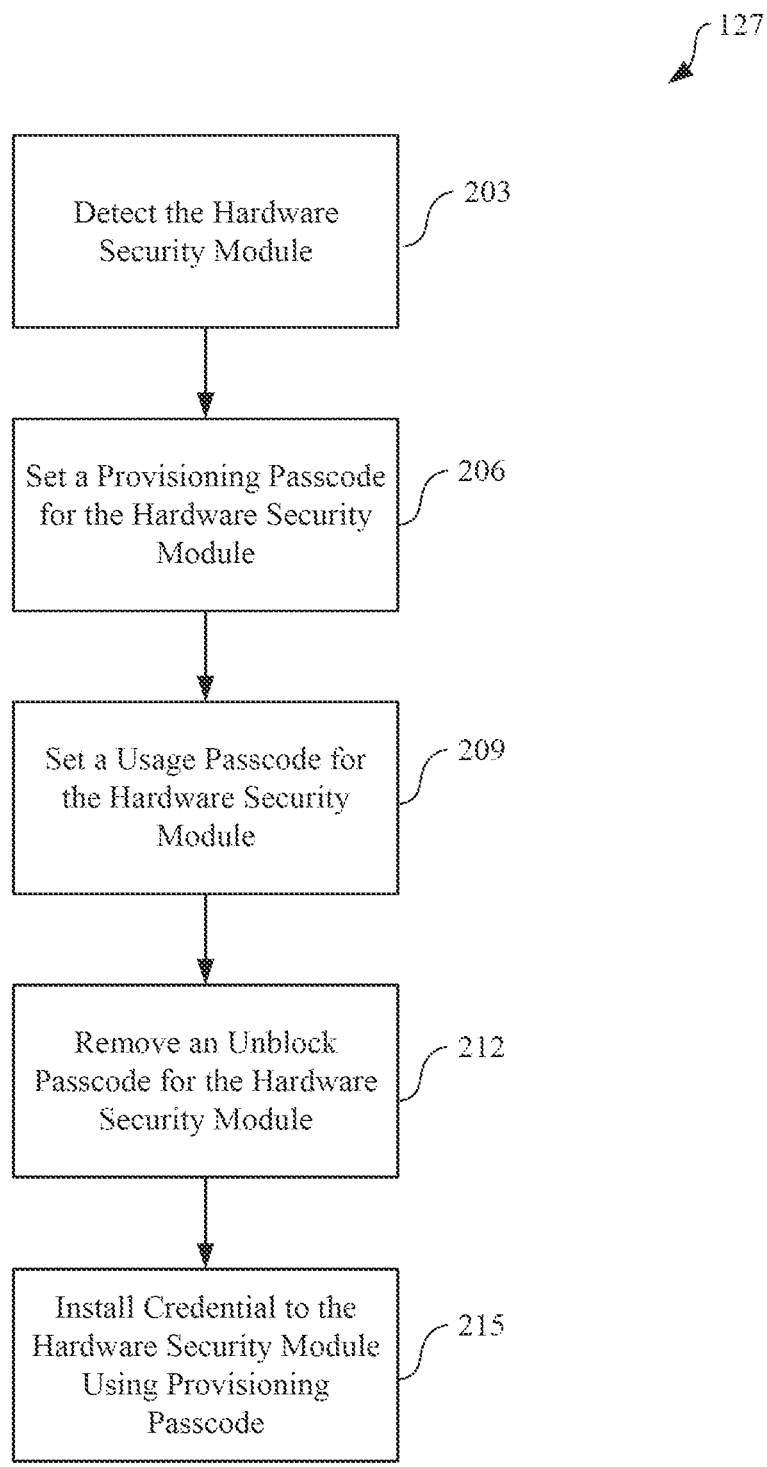
FIG. 2 shows a flowchart that provides one example of the operation of a portion of the cryptographic interface application, according to various embodiments of the present disclosure.

FIG. 2 shows a flowchart that provides one example of the operation of a portion of the cryptographic interface application 127. The flowchart of FIG. 2 provides merely an example of the many different types of functional arrangements that can be employed to implement the operation of the depicted portion of the cryptographic interface application 127. As an alternative, the flowchart of FIG. 2 can be viewed as depicting an example of elements of a method implemented within the networked environment 100.

At step 203, the cryptographic interface application 127 can set an accessory provisioning passcode 130a for the hardware security module 109. The cryptographic interface application 127 can access a current accessory provisioning passcode 130a for the hardware security module 109. If the cryptographic interface application 127 has not previously set an accessory provisioning passcode 130a, however, the cryptographic interface application 127 can access a factory default accessory provisioning passcode 130a.

At step 206, the cryptographic interface application 127 can set an accessory usage passcode 133 for the hardware security module 109. The cryptographic interface application 127 can access a current accessory usage passcode 133 for the hardware security module 109. If the cryptographic interface application 127 has not previously set an accessory usage passcode 133, however, the cryptographic interface application 127 can access a factory default accessory usage passcode 133.

At step 209, the cryptographic interface application 127 can remove an accessory unblock passcode 136 for the hardware security module 109. The accessory unblock passcode 136 can be supplied to clear a blocked state of the hardware security module 109.

At step 212, the cryptographic interface application 127 can install credentials 139 to the hardware security module 109 using the accessory provisioning passcode 130a. In some implementations, the cryptographic interface application 127 can install credentials 139 on the hardware security module 109 using the accessory provisioning passcode 130a. In some implementations, the cryptographic interface application 127 can receive a certificate signing request from the hardware security module 109, which the cryptographic interface application 127 can provide to a certifying authority. The cryptographic interface application 127 can interact with a user of the client device 106 to complete a credential issuance process.

Figure 3:
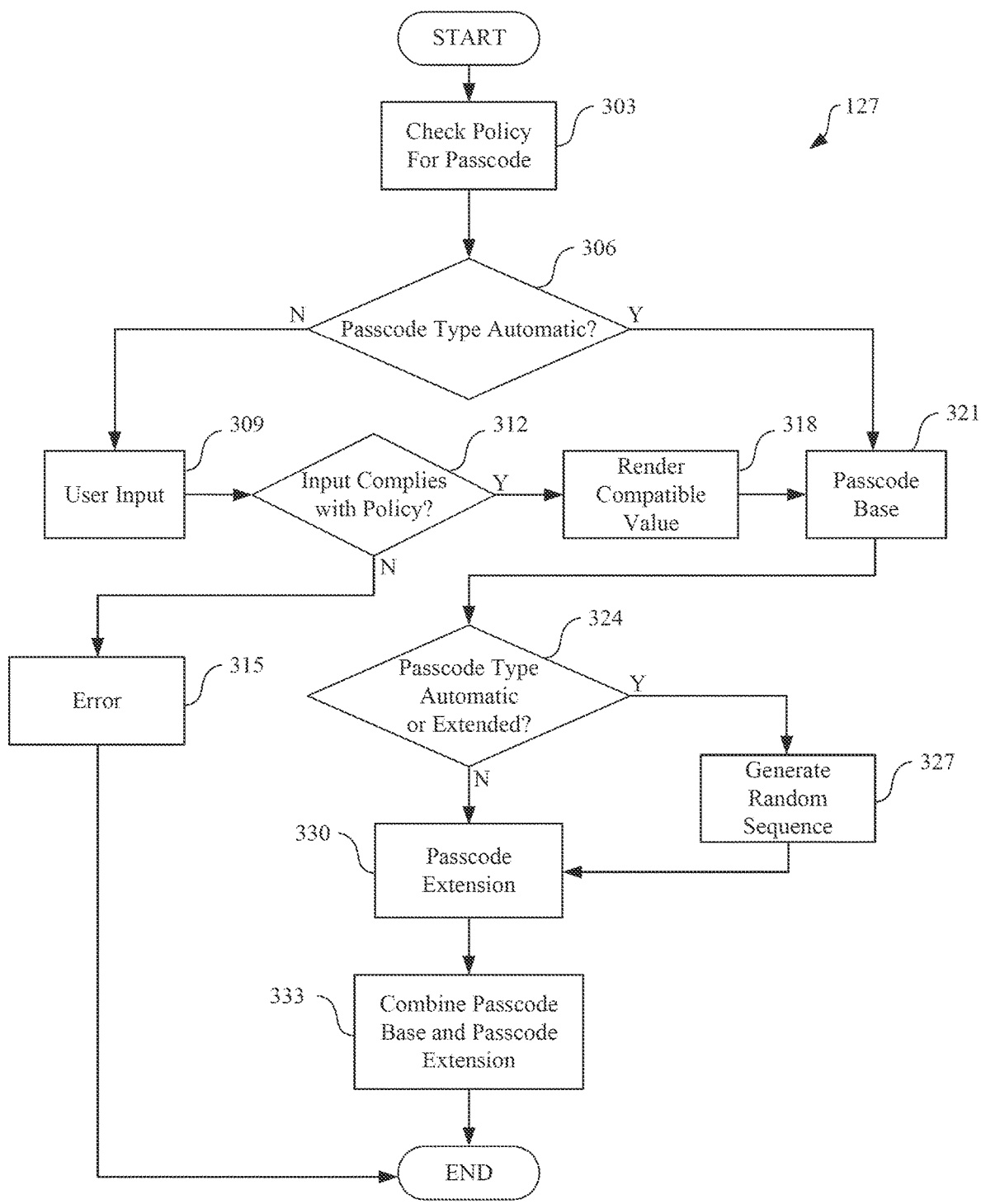
FIG. 3 shows a flowchart that provides one example of the operation of a portion of the cryptographic interface application for generating an accessory provisioning passcode, an accessory usage passcode, or an accessory unblock passcode, according to various embodiments of the present disclosure.

FIG. 3 shows a flowchart that provides one example of the operation of a portion of the cryptographic interface application 127 for generating an accessory provisioning passcode 130a, an accessory usage passcode 133, or an accessory unblock passcode 136. The flowchart of FIG. 3 provides merely an example of the many different types of functional arrangements that can be employed to implement the operation of the depicted portion of the cryptographic interface application 127. As an alternative, the flowchart of FIG. 3 can be viewed as depicting an example of elements of a method implemented within the networked environment 100.

At step 303, the cryptographic interface application 127 can identify from the policy 116 one or more compliance rules regarding a passcode 130 to be generated. The policy 116 may specify one or more compliance rules for an accessory provisioning passcode 130a, an accessory usage passcode 133, or an accessory unblock passcode 136. The one or more compliance rules can, for example, specify acceptable values for a passcode 130, what format(s) a passcode 130 may take, and other requirements for the passcode 130. In particular, the one or more compliance rules from the policy 116 can specify whether the passcode 130 is to be an automatic passcode, an extended passcode, a compliant passcode, or other type of passcode 130. What compliance rules apply to the passcode 130 to be generated can depend on whether the passcode is to be an accessory provisioning passcode 130a, an accessory usage passcode 130b, or an accessory unblock passcode 130c.

At step 306, the cryptographic interface application 127 can determine whether the passcode 130 is to be an automatic passcode. The cryptographic interface application 127 can make this determination based on the one or more compliance rules identified at step 303. An automatic passcode can include a random value generated by the cryptographic interface application 127, the format and other requirements of which can be specified by the policy 116. An automatic passcode can be completely hidden from a user of the client device 106. If the passcode 130 is to be automatic, the process can proceed to step 321. If the passcode 130 is not to be automatic, then the process can proceed to step 309.

At step 309, the cryptographic interface application 127 can receive user input from a user of the client device 106. The user input can comprise all or part of the passcode 130 that is intended to be generated. The user input can be received via a user interface 128 rendered by the cryptographic interface application 127 in a display of the client device 106.

At step 312, the cryptographic interface application 127 can determine whether the user input complies with the policy 116. The acceptable values for the user input may be dictated by the policy 116. The cryptographic interface application 127 can determine, for example, whether the user input comprises allowable characters or types of characters, complies with a minimum and/or maximum allowable length, or includes a specified number or arrangement of letters, numbers, or symbols. In some implementations, the policy 116 can specify that user input may be compliant even if the user input is not in a format supported by the hardware security module 109 so long as that user input can be rendered in a format that is compatible with the hardware security module 109. If the user input complies with the policy 116, the process can proceed to step 318. If the user input does not comply with the policy 116, however, the process can proceed to step 315.

At step 315, the cryptographic interface application 127 can provide an error message to the user. The error message can be provided via the user interface 128. The error message can indicate that the user input cannot be accepted and, in some implementations, why the user input does not comply with the policy. The process can then proceed to completion, though in some implementations the process can instead proceed back to step 309 and again prompt the user for user input.

At step 318, the cryptographic interface application 127 can render the user input as a value that is compatible with the hardware security module 109. This step can be optional and can be performed if the user input is in a format that is unsupported by the hardware security module 109 but is otherwise compliant with the policy 116.

At step 321, the cryptographic interface application 127 can generate a passcode base 142. The passcode base 142 can be generated from the value rendered at step 318. The passcode base 142 can comprise a user-generated portion of the passcode 130 to be generated.

At step 324, the cryptographic interface application 127 can determine whether the passcode 130 is automatic or extended. An extended passcode can include a random sequence together with a user-input value. The extended passcode can comprise a user input passcode base 142 plus an automatic passcode extension 124. If yes, the process can proceed to step 327. Otherwise, the process can proceed to step 330.

At step 327, the cryptographic interface application 127 can generate a random sequence. To do so, the cryptographic interface application 127 can use a suitable secure random number generated provided by the client device 106. The cryptographic interface application 127 can refrain from displaying this random sequence to a user of the client device 106.

At step 330, the cryptographic interface application 127 can generate a passcode extension 124. The passcode extension 124 can comprise a value generated and stored in the protected data-at-rest 121 by the cryptographic interface application 127.

At step 333, the cryptographic interface application 127 can generate the passcode 130 by combining the passcode base 142 and the passcode extension 124. The cryptographic interface application 127 can combine the passcode base 142 and the passcode extension 124 using concatenation, cryptographic hashing, or any other suitable method. The process can then proceed to completion.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A system comprising:
a client device comprising a processor and a memory; and
a cryptographic interface application stored in the memory that, when executed by the processor, causes the client device to at least:
detect a hardware security module associated with the client device;
receive, from a management service over a network, a policy containing a set of rules for operating the hardware security module;
set a provisioning passcode for the hardware security module that complies with the set of rules of the policy received from the management service;
set a usage passcode for the hardware security module;
remove an unblock passcode for the hardware security module;
install at least one credential on the hardware security module using the provisioning passcode;
receive, from a client application installed on the client device, a request for the at least one credential installed on the hardware security module;
determine that the client application is permitted to access the at least one credential installed on the hardware security module based on the set of rules of the policy received from the management service; and
provide the client application access to the at least one credential.

2. The system of claim 1, wherein the hardware security module comprises a trusted platform module (TPM) chip installed in the client device or an external portable hardware authentication device that is connectable to the client device.

3. The system of claim 1, wherein the provisioning passcode is used to modify a credential store of the hardware security module.

4. The system of claim 1, wherein the usage passcode causes the hardware security module to process cryptographic operations with stored credentials.

5. The system of claim 4, wherein the unblock passcode clears a blocked state of the hardware security module, the blocked state comprising a state in which the usage passcode will not cause the hardware security module to process the cryptographic operations.

6. The system of claim 1, wherein the cryptographic interface application, when executed by the processor, further causes the client device to at least:
receive an updated policy from the management service;
determine that the client device fails to comply with the updated policy; and
reject a second request for the at least one credential from the client application.

7. The system of claim 1, wherein the cryptographic interface application, when executed by the processor, further causes the client device to at least, in response to receiving a factory reset command:
delete the at least one credential; and
reset the provisioning passcode, the usage passcode, and the unblock passcode.

8. The system of claim 1, wherein the cryptographic interface application, when executed by the processor, further causes the client device to at least:
receive a public key and a key pair locator that enables locating a passcode recovery service;
generate a passcode recovery file comprising the key pair locator and the usage passcode, the passcode recovery file being encrypted using the public key; and
provide the passcode recovery file to a remote data store.

9. A method, comprising:
detecting a hardware security module associated with a client device;
receiving, by the client device from a management service over a network, a policy including a set of rules for operating the hardware security module;
setting a provisioning passcode for the hardware security module that complies with the set of rules of the policy received from the management service;
setting a usage passcode for the hardware security module;
removing an unblock passcode for the hardware security module; and
installing at least one credential on the hardware security module using the provisioning passcode;
receiving, from a client application installed on the client device, a request for the at least one credential installed on the hardware security module;
determining that the client application is permitted to access the at least one credential installed on the hardware security module based on the set of rules of the policy received from the management service; and
providing the client application access to the at least one credential.

10. The method of claim 9, wherein the provisioning passcode is used to modify a credential store.

11. The method of claim 9, wherein the usage passcode is used to process cryptographic operations with stored credentials.

12. The method of claim 9, wherein the unblock passcode clears a blocked state of the hardware security module.

13. The method of claim 9, further comprising:
receiving an updated policy from the management service;
determining that the client device fails to comply with the updated policy; and
rejecting a second request for the at least one credential from the client application.

14. A non-transitory, computer-readable medium comprising machine-readable instructions that, when executed by a processor of a client device, cause the processor to at least:
detect a hardware security module connected to the client device;
receive, by the client device from a management service over a network, a policy including a set of rules for operating the hardware security module;
set a provisioning passcode for the hardware security module that complies with the set of rules of the policy received from the management service;
set a usage passcode for the hardware security module;
remove an unblock passcode for the hardware security module; and
install at least one credential on the hardware security module using the provisioning passcode;

receive, from a client application installed on the client device, a request for the at least one credential installed on the hardware security module;

determine that the client application is permitted to access the at least one credential installed on the hardware security module based on the set of rules of the policy received from the management service; and provide the client application access to the at least one credential.

15. The non-transitory computer-readable medium of claim 14, wherein the hardware security module comprises a trusted platform module (TPM) chip installed in the client device or an external portable hardware authentication device that is connectable to the client device.

16. The non-transitory computer-readable medium of claim 14, wherein the provisioning passcode is used to modify a credential store, the usage passcode is used to process cryptographic operations with stored credentials, and the unblock passcode clears a blocked state of the hardware security module.

17. The non-transitory computer-readable medium of claim 14, further comprising machine-readable instructions that, when executed by the processor, further causes the processor to at least:

receive an updated policy from the management service;

determine that the client device fails to comply with the updated policy; and reject a second request for the at least one credential from the client application.

* * * * *